Figure 2A:
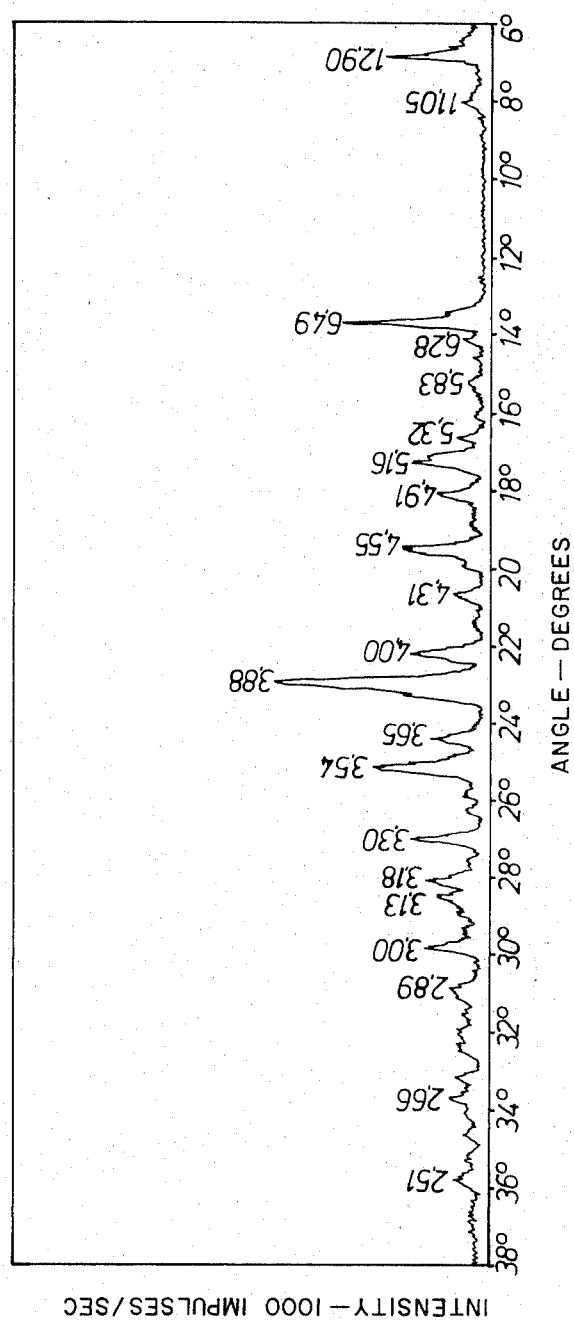

United States Patent [19]
Vernaleken et al.

[11] 3,821,294
[45] June 28, 1974

[54] PROCESS FOR PRODUCING VERY PURE TETRA CHLOROBISPHENOL A

[75] Inventors: Hugo Vernaleken, Krefeld; Ralf Lange; Hermann Schnell, both of Krefeld-Uerdingen; Hans-Helmut Schwarz, Krefeld-Bockum, all of Germany

[73] Assignee: Bayer Aktingesellschaft, Leverkusen, Germany

[22] Filed: June 28, 1971

[21] Appl. No.: 157,171

[30] Foreign Application Priority Data
June 29, 1970 Germany.............................. 2032073

[52] U.S. Cl............................. 260/520, 260/619 A
[51] Int. Cl... C07c 65/02, C07c 39/24, C07c 39/16
[58] Field of Search....................... 260/619 A, 520

[56] References Cited
UNITED STATES PATENTS
2,182,308  12/1939  Britton et al............... 260/621 A X
2,254,904  9/1941   Moss........................... 260/619 A X
2,455,652  12/1948  Bralley et al................ 260/619 A X Primary Examiner—Bernard Helfin
Assistant Examiner—Norman Morgenstern
Attorney, Agent, or Firm—Connolly & Hutz

[57] ABSTRACT

Preparation of title product by cooling a hot solution of crude title product in acetic acid at a concentration of from 10–40 percent by weight and containing up to about 10 percent by weight of water to a temperature of about 55° to about 15°C. to produce a crystalline adduct of said product and acetic acid in a molar ratio of 1:2, separating said crystalline adduct from the mother liquor and decomposing said adduct into relatively pure tetrachlorobisphenol A and acetic acid.

5 Claims, 4 Drawing Figures

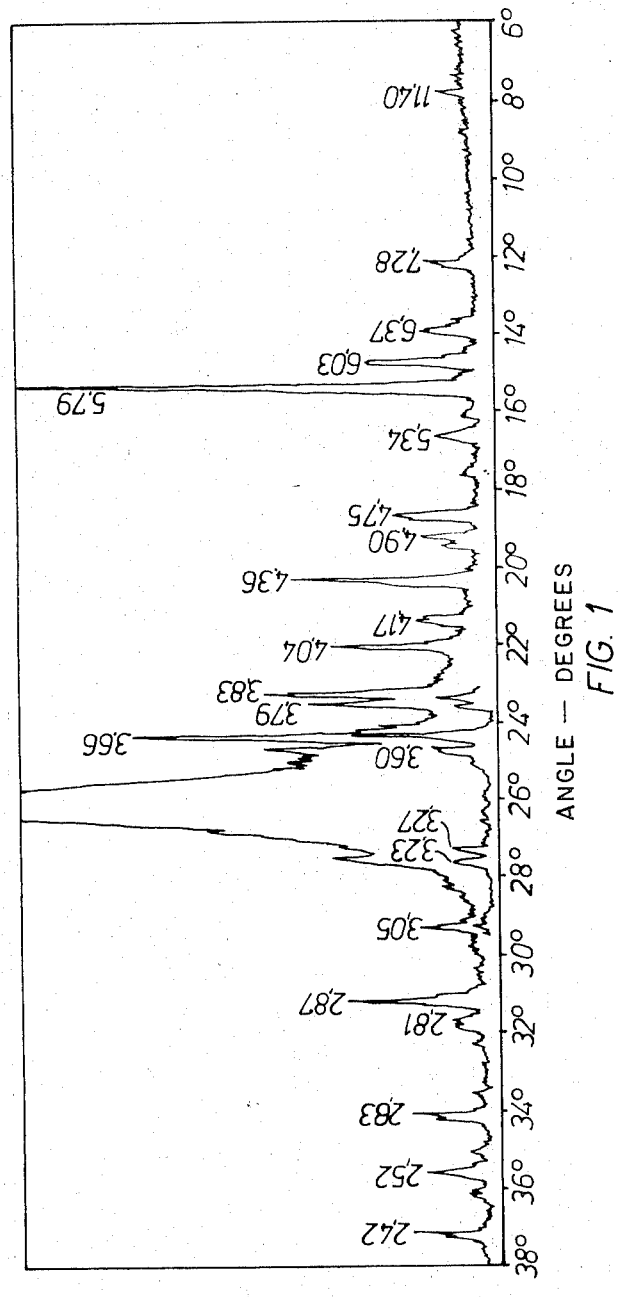

PROCESS FOR PRODUCING VERY PURE TETRA CHLOROBISPHENOL A

The invention relates to a particularly advantageous process for obtaining very pure tetrachlorobisphenol A (3,3',5,5'-tetrachloro-4,4'-dihydroxydiphenylpropane-2,2), such as is for example required to manufacture very heat-resistant polycondensation products of low inflammability, such as aromatic polyesters, especially polycarbonates. Such a product was hitherto obtainable only by repeated recrystallisation of the crude products.

It has been found that from about 40 to about 10 percent by weight solutions of tetrachlorobisphenol A in acetic acid, containing up to about 10 percent by weight of water, crystallize out as an adduct of 1 mol of tetrachlorobisphenol A and 2 mols of acetic acid within the temperature range of between about 55° and about 15°C. This adduct may be decomposed thermally or by treatment with water into tetrachlorobisphenol A and acetic acid. By this method of isolation of the tetrachlorobisphenol A there is obtained a very pure end product even when starting with heavily contaminated crude product.

The crystallization of the adduct can be brought about either by preparing a solution of the crude tetrachlorobisphenol A in the acetic acid, in the concentration range of between about 40 and about 10 percent by weight, at a temperature above that at which the crystallization of the adduct begins by (a) dissolving the crude product in the appropriate amount of acetic acid, or (b) by concentrating a more dilute starting solution and cooling this solution, or (c) by bringing a more dilute starting solution to a temperature within the indicated temperature range and isothermally evaporating off excess acetic acid.

The subject of the invention is therefore a process for the manufacture of very pure tetrachlorobisphenol A, which is characterised by crystallizing out a tetrachlorobisphenol A-acetic acid adduct in the molar ratio of 1:2 at a temperature of about 55° to about 15°C from a solution of crude tetrachlorobisphenol A in acetic acid, containing up to about 10 percent by weight of water, by cooling and/or by isothermal evaporation of excess acetic acid, separating the adduct from the mother liquor recovering and the tetrachlorobisphenol A by decomposing the adduct.

As already mentioned, decomposition can be brought about by heating the adduct, if appropriate under reduced pressure, whereupon the acetic acid evaporates and the pure tetrachlorobisphenol A is left.

A particularly pure product is however obtained by treating the adduct with water to which it is possible to add (1) a reducing agent, for example sulphur dioxide, sulphites, thiosulphates, dithionites or oxalic acid, in amounts of about 0.01 to about 1 percent by weight, in order to remove oxidising impurities which may have been produced during the manufacture of the tetrachlorobisphenol, and also (2) wetting agents or complex-forming agents such as nitrilotriacetic acid and ethylenediaminotetraacetic acid which bind metal cations which have passed into the crude product as a result of the use of metal catalysts or through corrosion of metal apparatus such as, say, nitrilotriacetic acid and ethylenediaminotetraacetic acid.

The amount of water required for decomposition of the adduct is at least about 0.5 part of weight per 1 part by weight of adduct. In order not to allow an unnecessarily dilute acetic acid to be produced, it is advisable not to exceed about 5 parts by weight of water per 1 part by weight of adduct. In general, about 1 to about 2 parts by weight of water per 1 part by weight of adduct easily suffice.

One way of effecting the decomposition of the adduct is by treating the crystalline adduct with water, appropriately in the temperature range of about 20° to about 90°C, preferably to about 50°C. For this purpose it is, for example, possible to employ a stirring vessel or a solid-liquid extraction apparatus. The adduct decomposes in a short time, and dilute aqueous acetic acid and pure tetrachlorobisphenol are obtained; the latter can be separated from the suspension, for example by filtration, and can be freed of remaining adhering liquid by drying.

It is however also possible to dissolve the adduct in an inert organic solvent which dissolves the adduct and the tetrachlorobisphenol A, but is practically immiscible with water, to treat the solution with water, for example by means of a mixer-separator apparatus or an extraction column, to separate off the organic phase and to isolate the tetrachlorobisphenol A therefrom, for example by evaporating the solvent.

Solvents suitable for this purpose are, for example, benzene, toluene, chlorobenzene, chlorotoluene and 1,2-dichloroethane.

In this liquid/liquid extraction, which can be carried out at room temperature with about 0.5 to about 1 to 2 parts by weight of water per 1 part by weight of adduct, acetic acid and is only slightly diluted is produced, which can easily be re-concentrated by distillation or extraction with solvents and re-employed for fresh adduct formation. Liquid/liquid extraction is therefore particularly suitable for continuous operation with recycling of the acetic acid.

If the end product has to meet extremely high purity requirements, the process can be further supplemented in that the adduct first produced, before being decomposed, is again recrystallised from acetic acid, so that an adduct again crystallises out in the temperature range of between about 15° and about 55°C, this being decomposed, thereafter, according to one of the methods described.

Finally, the tetrachlorobisphenol can also be obtained from the adduct by melting the adduct and concentrating to such a high concentration above the peritectic temperature for the adduct, namely 55°C, for example at 65°C, that pure tetrachlorobisphenol crystallizes out on cooling.

Since it is known that the chlorination of phenols can be carried out in acetic acid solution, the new purification process for tetrachlorobisphenol A via the acetic acid adduct is particularly suitable for direct coupling with the manufacture of the tetrachlorobisphenol by chlorination of bisphenol A in acetic acid, the process being appropriately carried out continuously.

Thus it is for example possible to feed a suspension or solution of bisphenol A in acetic acid, the water content of which should however not exceed about 5 percent by weight, whilst its concentration exerts practically no influence on the quality of the chlorination product — a bisphenol concentration of about 10 to about 25 percent by weight has proved advantageous with regard to the production of byproducts and decomposition products — continuously to a stirred kettle cascade or a reaction column subjected to chlorine gas. Suitable reaction temperatures lie between about 15° and about 55°C, preferably between about 25° and about 45°C. The tetrachlorobisphenol-acetic acid solution which issues continuously is then passed continuously to the adduct crystallization process, which takes place under the conditions indicated above. The mother liquor can be predominantly, that is to say up to about 50 to 95 percent, preferably 70 to 90 percent, returned to the chlorination stage. The amount of bisphenol A separated out, and the amount of acetic acid removed from the system, if appropriate including the acetic acid split off from the adduct, can be continuously replaced in the chlorination stage, so that stable and stationery operating conditions result for the entire process.

In general it is advisable to add suitable catalysts, for example pyridine or nickel salts, during the chlorination. As a result, the chlorination takes place more rapidly and more selectively in favour of tetrachlorobisphenol, and the splitting of the bisphenol, and the formation of excessively chlorinated and alkyl-chlorinated products, which can otherwise be observed during the chlorination in acetic acid, are largely suppressed, so that the yield relative to chlorine is almost quantitative.

EXAMPLE 1

1,000 g of a tetrachlorobisphenol A crude material are dissolved in 2,400 g of acetic acid, containing 6 percent by weight of water, at 53°C. After cooling this solution to 20°C, 1,050 g of crystalline acetic acid/tetrachlorobisphenol A adduct are obtained, containing 26.1 percent by weight of acetic acid after removing the mother liquor by centrifuging. 100 g of the adduct are thermally decomposed into tetrachlorobisphenol and acetic acid at 50° – 60°C, in vacuo.

The adduct is characterised by the following properties:

a. X-ray structure characteristics: lattice plane spacings (see FIG. 1).

b. Peritectic in the melting point diagram in the system acetic acid/tetrachlorobisphenol A. The peritectic temperature is 55°C.

c. Content of acetic acid: 26.1 percent by weight (the calculated acetic acid content for an adduct of 2 mols of acetic acid and 1 mol of TCB is 24.7 percent by weight).

The purification effect of the crystallization described:

| Product | Solidification Point °C | Colour of the Melt, Hazen scale | Saponifiable Chlorine ppm. | Content of mono-, di- and trichlorophenol, % by weight |
|---|---|---|---|---|
| Crude TCB | 129 | 400 | 950 | 3.2 |
| TCB (from adduct) | 133.2 | 90 | 86 | <0.1 |

EXAMPLE 2

Figure 2B:
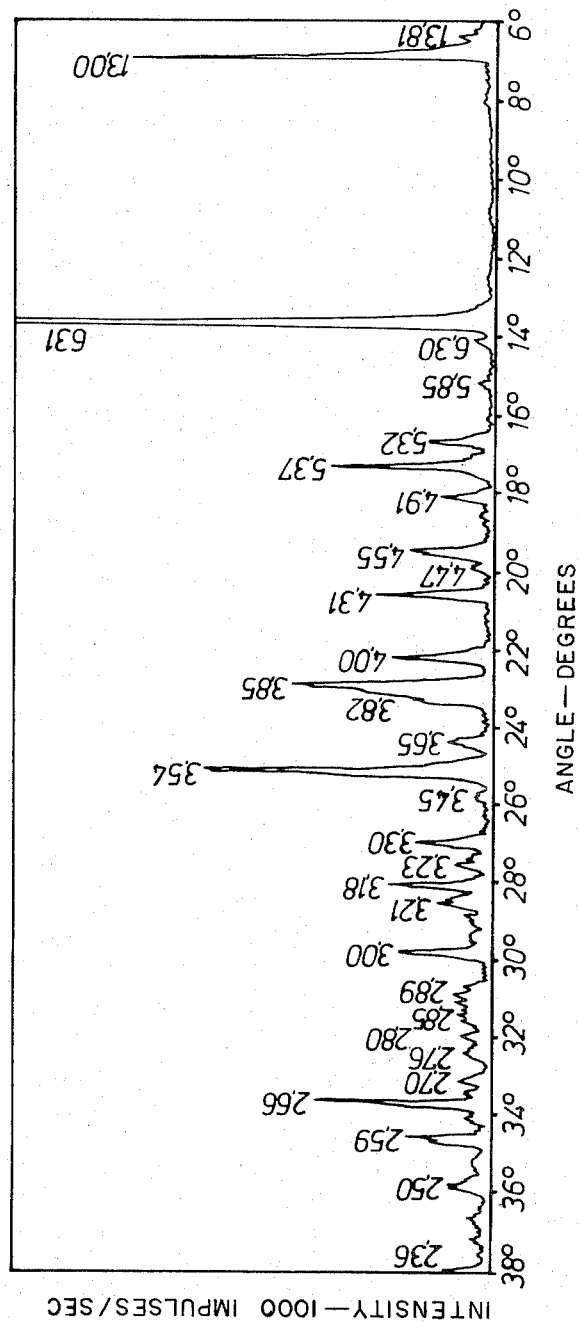

1,000 g of acetic acid/TCB adduct containing 260 g of acetic acid are melted at 95°C and then cooled to 65°C, whereupon TCB crystallizes out, which is separated from the mother liquor by centrifuging, again at 65°C. The isolated product contains <2 percent by weight of acetic acid. The X-ray structure characteristics correspond to those of the TCB (dry) (compare FIGS. 2/A and 2/B).

EXAMPLE 3

228 g (1 mol) of bisphenol A are dissolved in 950 g of acetic acid and 20 g of water and chlorinated, by passing in 291 g (4.1 mols) of chlorine gas over the course of 1.5 hours, to give tetrachlorobisphenol A. The temperature is kept at 40°C during the reaction. After separating off the hydrochloric acid, which is produced during the chlorination and partly dissolves, by applying a vacuum, the solution is cooled to 20°C, whereupon 350 g of acetic acid/TCB adduct crystals separate out. The crystals are filtered off, rinsed with a little acetic acid and centrifuged. The acetic acid content is 25.7 percent by weight.

100 g of the isolated adduct are thermally decomposed into TCB and acetic acid at 50°C and 20 mm Hg. Additionally, 100 g of the adduct are extracted with 100 g of water at 90°C, and subsequently dried in vacuo.

| Product | Solidification Point °C | Colour of the Melt, Hazen scale | Saponifiable Chlorine ppm. | Content of mono-, di- and trichlorophenol, % by weight |
|---|---|---|---|---|
| TCB from adduct, thermally decomposed | 132.9 | 100 (reddish) | 98 | ~0.1 |
| TCB from adduct, by solid/liquid extraction with water | 133.4 | 40 | 35 | not detectable by gas chromatography |

EXAMPLE 4

Bisphenol A is chlorinated as in Example 3, but with the addition of 0.3 percent by weight of NiCl$_2$, relative to bisphenol A. The chlorination takes place in 45 minutes.

100 g of adduct are thermally decomposed as in Example 3.

| Product | Solidification Point °C | Colour of the Melt, Hazen scale | Saponifiable Chlorine ppm. | Content of mono-, di- and trichlorophenol, % by weight |
|---|---|---|---|---|
| TCB from adduct, thermally decomposed | 133.6 | 90 | 55 | <0.1 |

EXAMPLE 5

Figure 3:
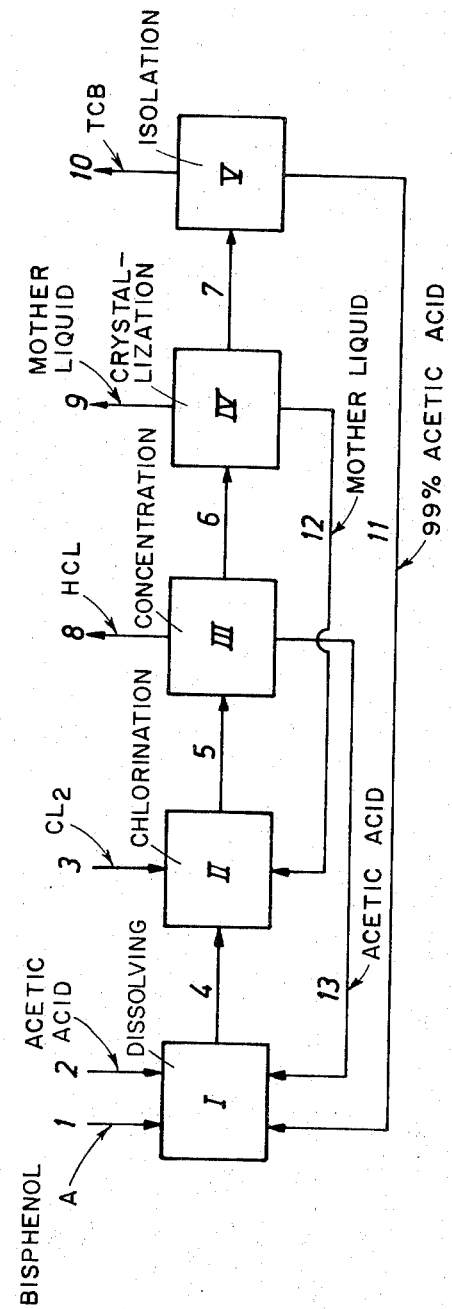

Bisphenol A is continuously chlorinated in accordance with the scheme outlined in FIG. 3, the mother liquor being recycled.

An 11.1 percent strength by weight bisphenol A solution in acetic acid, which contains about 0.5 percent by weight of water, is continuously pumped from the dissolving kettle (I) through the pipeline 4 into the chlorination rector (II). Chlorination is carried out in (II), at a temperature kept constant at 40°C. The hourly throughput is 0.555 kg of bisphenol A and 0.7 kg of chlorine. The chlorination solution, containing hydrogen chloride, is passed via the pipeline 5 to the distillation stage (III) at 50°C, where it is degassed and concentrated in such a way that the weight ratio of tetrachlorobisphenol A: acetic acid is 1:2.5. The hydrogen chloride separatd off in stage (III) is withdrawn through the pipeline 8, and the acetic acid distilled off in (III) is recycled through the pipeline 13 to (I).

The solution which flows from (III) through the pipeline 6 into the crystallizer (IV) is cooled in (IV) to 20°C, whereupon 1.0 kg/hour of acetic acid/TCB adduct separates out.

80 percent of the mother liquor arising in the crystallization in (IV) are pumped back through the pipeline 12 into the chlorination stage (II), and the remainder 20 percent is expelled through the pipeline 9 and separately worked-up.

The adduct isolated by centrifuging after crystallization is passed through the pipeline 7 to continuous counter-current extraction in a solid/liquid extraction column (V), using water at 50°C, with 1 kg of water being employed per 1 kg of adduct. The extraction water contains 1 percent by weight of sodium thiosulphate. The TCB, damp with water, is dried in vacuo at 70°C.

The acetic acid losses resulting from expulsion of mother liquor are continuously made up through the pipeline 2 in stage (I). The dilute acetic acid produced in the solid/liquid extraction V is worked-up on a subsidiary installation and returned, as a 99 percent strength by weight acetic acid, to stage I via pipeline 11. Bisphenol A is continuously charged in through pipeline 1, and TCB is removed through pipeline 10.

| Product | Solidification Point % | Colour of the Melt, Hazen scale | Saponifiable Chlorine ppm. | Content of di-, and tri-chlorophenol, % by weight |
|---|---|---|---|---|
| TCB obtained from adduct by drying | 132.8 | 150 (reddish-tinged) | 120 | 0.1 |
| TCB from water extraction | 133.1 | 60 | 30 | not detectable by gas chromatography |

EXAMPLE 6

1 kg of the acetic acid/TCB adduct isolated in the crystallizer stage (IV) in Example 5, is continuously extracted with 0.7 kg of water at 90°C. The moist TCB separated off is rinsed with 0.2 kg of water and dried.

| Product | Solidification Point % | Colour of the Melt, Hazen Scale | Saponifiable Chlorine ppm. | Content of mono-, di- and tri-chlorophenol, % by weight |
|---|---|---|---|---|
| TCB extracted with water | 133.4 | 70 | 40 | not detectable (by gas chromatography) |

EXAMPLE 7

A 10 percent strength of weight solution of the adduct in chlorobenzene (Example 5, crystallizer stage (IV)) is continuously extracted in counter-current at 30°C in a perforated plate column. The weight ratio of chlorobenzene phase to aqueous phase is 4:1. TCB is obtained from the organic phase by evaporating off the solvent.

| Product | Solidification Point % | Colour of the Melt, Hazen scale | Saponifiable Chlorine ppm. | Content of mono-, di- and tri-chlorophenol, % by weight |
|---|---|---|---|---|
| TCB obtained from adduct by liquid-liquid extraction | 133.3 | 30 | 35 | < 0.1 |

EXAMPLE 8

A solution of the adduct in chlorobenzene, containing 10 percent by weight of TCB (from Example 5, crystallizer stage (IV)) is discontinuously extracted with an 0.5 percent strength aqueous oxalic acid solution at 40°C. One part by weight of aqueous phase is used per 1 part by weight of organic phase.

| Product | Solidification Point % | Colour of the Melt, Hazen scale | Saponifiable Chlorine ppm. | Content of Chlorophenols |
|---|---|---|---|---|
| TCB from adduct by liquid-liquid extraction | 133.5 | 20 | 40 | not detectable by gas chromatography |

We claim:

1. An adduct of tetrachlorobisphenol A and acetic acid wherein the molar ratio of tetrachlorobisphenol A to acetic acid is 1:2.

2. A process for obtaining very pure tetrachlorobisphenol A from crude tetrachlorobisphenol A which comprises cooling a hot solution of from about 10 to 40 percent by weight of crude tetrachlorobisphenol A in acetic acid which contains up to about 10 percent by weight of water to a temperature of about 55° to about 15°C. to produce a crystalline adduct of tetrachlorobisphenol A and acetic acid in a molar ratio of 1:2, separating said adduct from the mother liquor and decomposing said adduct into tetrachlorobisphenol A and acetic acid.

3. The process of claim 2 wherein said adduct is decomposed by evaporating acetic acid therefrom.

4. The process of claim 2 wherein said adduct is decomposed by treating the same with water.

5. The process of claim 2 wherein said adduct is dissolved in an inert organic solvent for the adduct and tetrachlorobisphenol A which is substantially immiscible with water and resulting solution is treated with water.

* * * * *